(No Model.) 10 Sheets—Sheet 1.
G. A. BUCHHOLZ, Dec'd.
O. KNIGHT, Administrator.
GRAIN REDUCTION MACHINE.
No. 425,366. Patented Apr. 8, 1890.
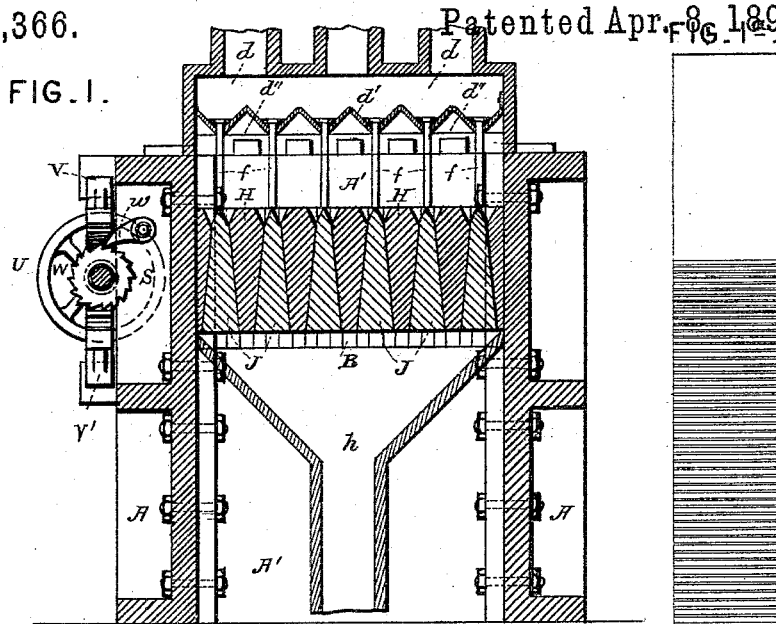
FIG. I.
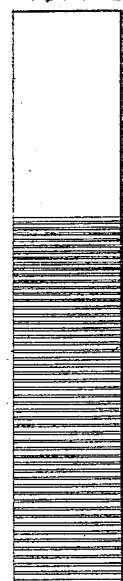
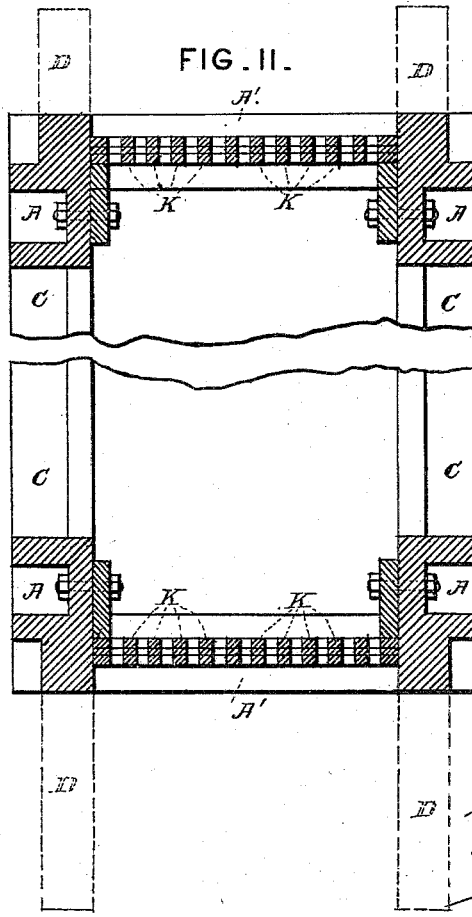
FIG. II.
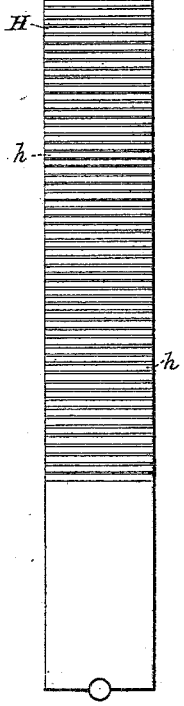
Attest:
W. E. Knight.
E. Arthur.
Inventor:
Gustav Adolph Buchholz
By Knight Bros
Atty (No Model.) 10 Sheets—Sheet 2.
G. A. BUCHHOLZ, Dec'd.
O. KNIGHT, Administrator.
GRAIN REDUCTION MACHINE.
No. 425,366. Patented Apr. 8, 1890.
FIG. III.
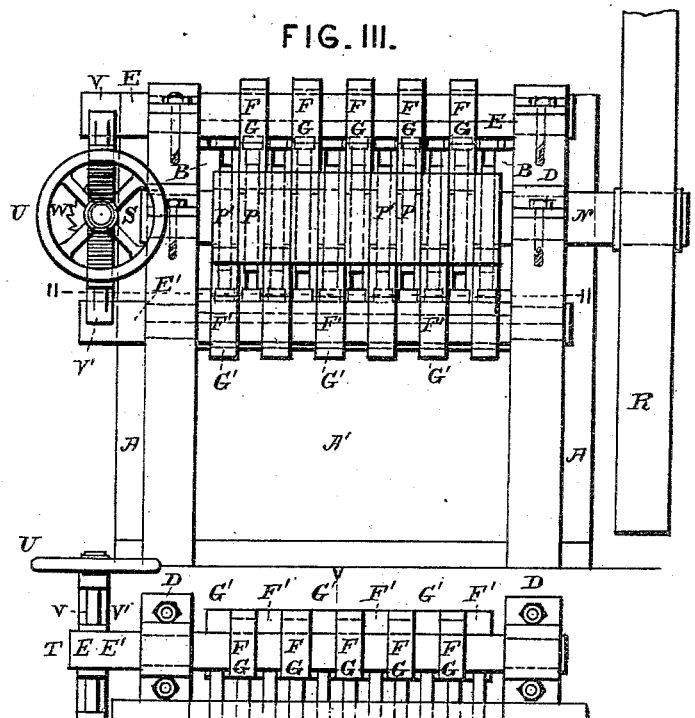
FIG. IV.
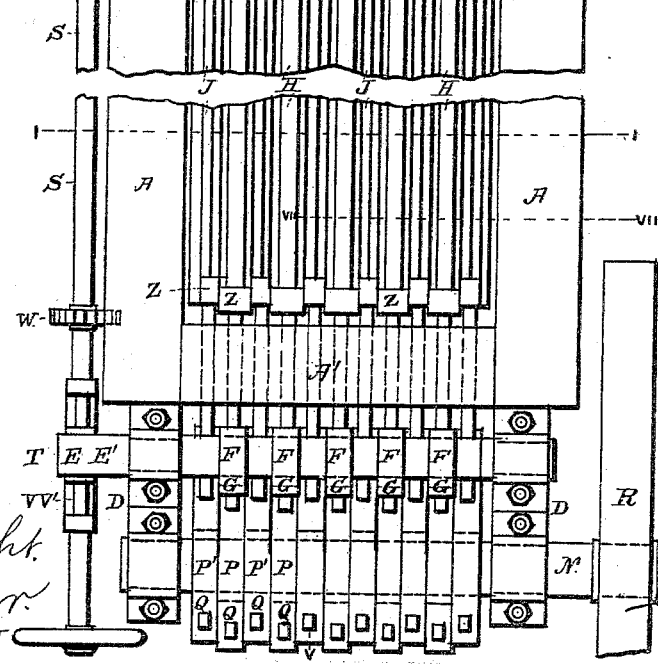
Attest:
W. E. Knight
E. Arthur
Inventor:
Gustav Adolph Buchholz
By Knight Bros
Attys (No Model.) 10 Sheets—Sheet 3.
G. A. BUCHHOLZ, Dec'd.
O. KNIGHT, Administrator.
GRAIN REDUCTION MACHINE.
No. 425,366. Patented Apr. 8, 1890.
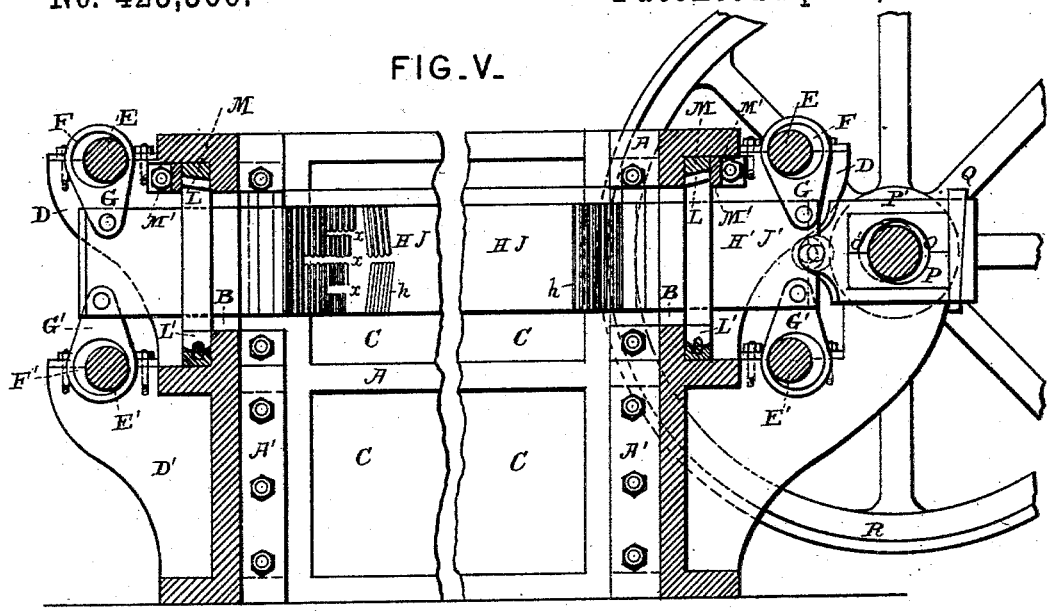
FIG. V.
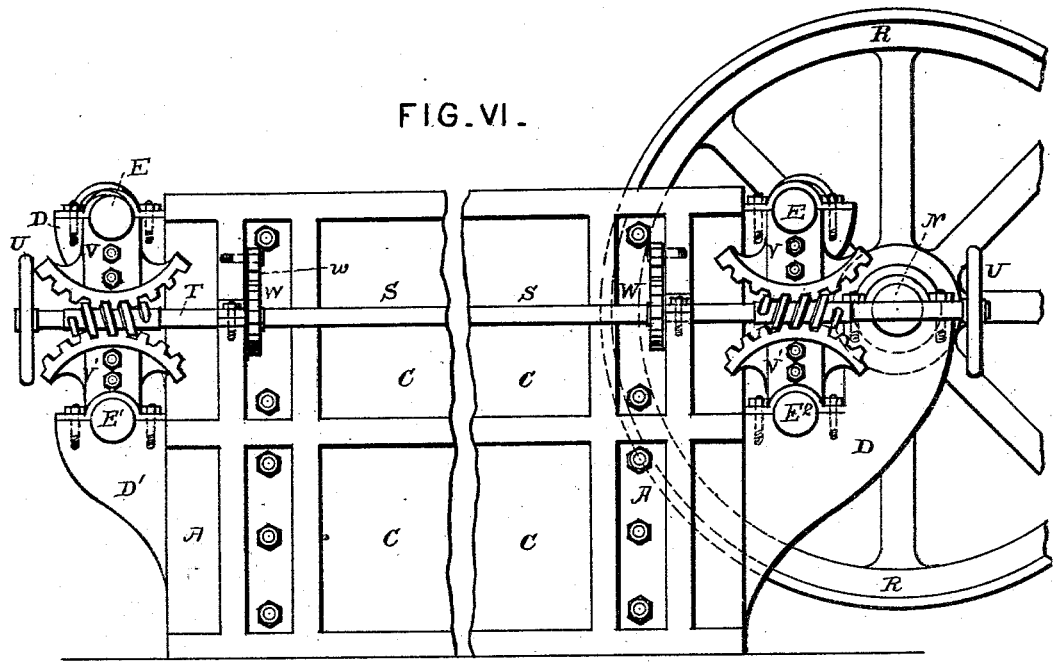
FIG. VI.
Attest:
W. E. Knight.
E. Arthur.
Inventor:
Gustav Adolph Buchholz
By Knight & Bro
Attys.

(No Model.) 10 Sheets—Sheet 4.
G. A. BUCHHOLZ, Dec'd.
O. KNIGHT, Administrator.
GRAIN REDUCTION MACHINE.
No. 425,366. Patented Apr. 8, 1890.
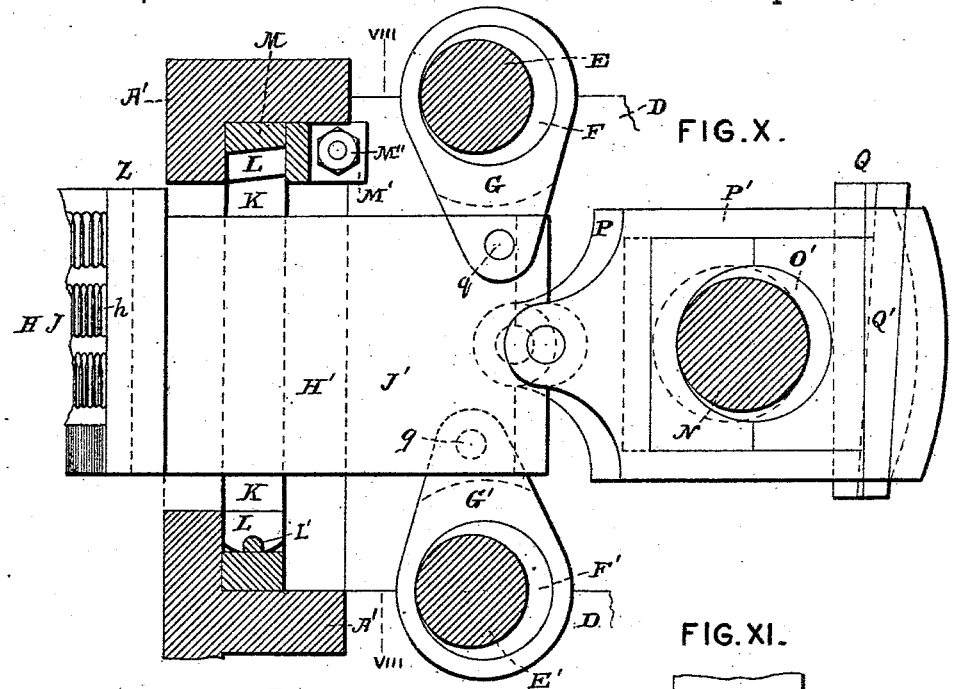
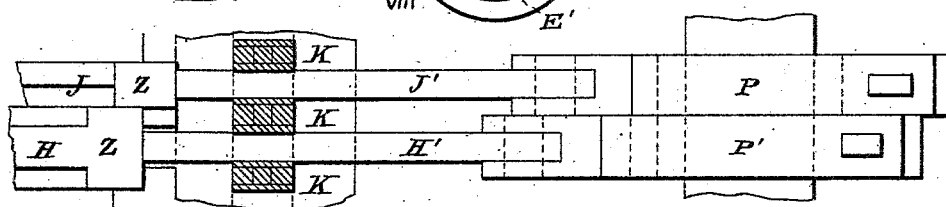
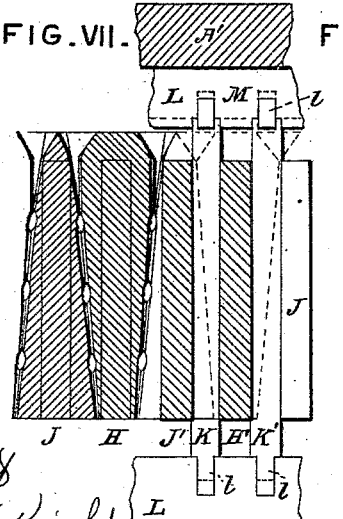
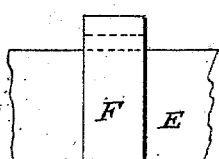
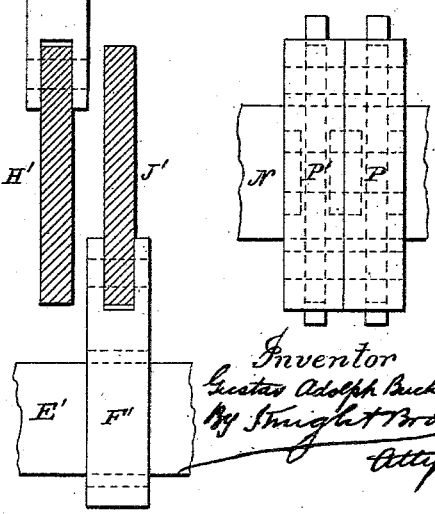

(No Model.) 10 Sheets—Sheet 5.
G. A. BUCHHOLZ, Dec'd.
O. KNIGHT, Administrator.
GRAIN REDUCTION MACHINE.
No. 425,366. Patented Apr. 8, 1890.
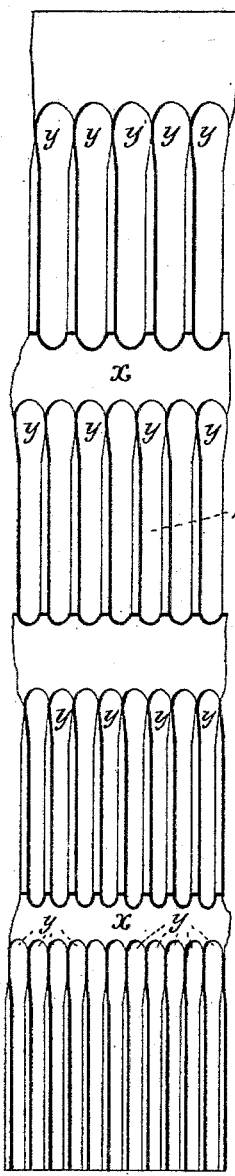
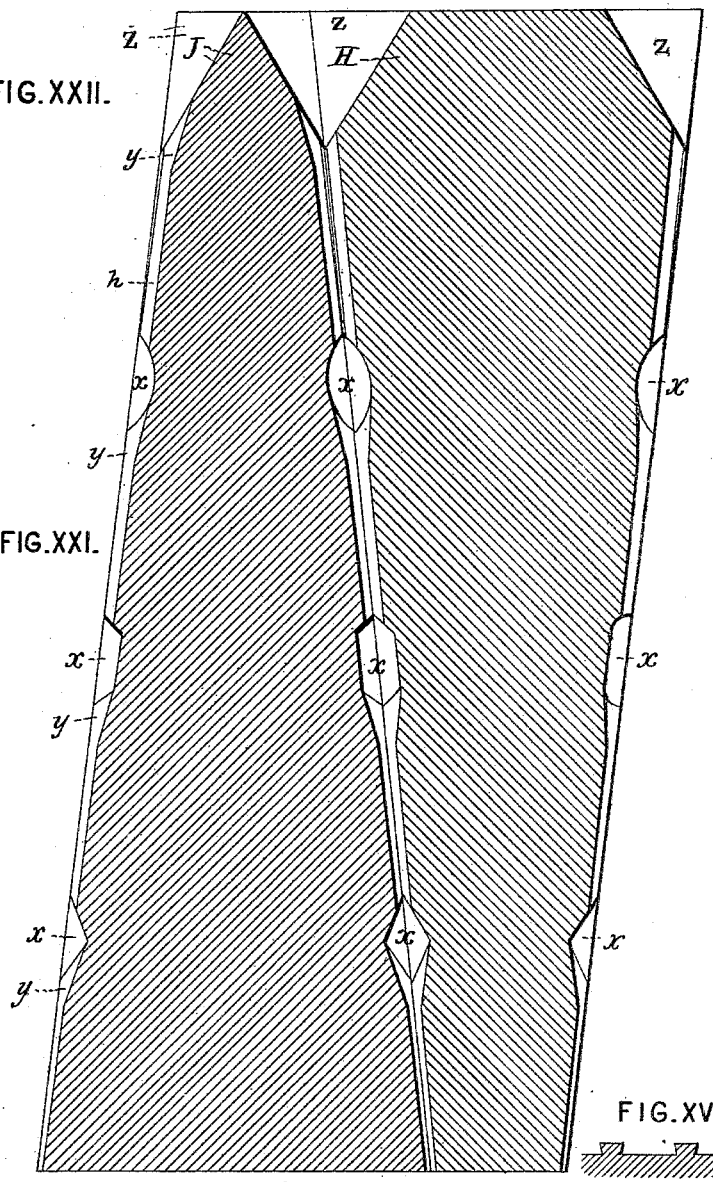
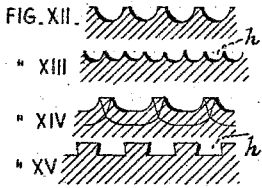
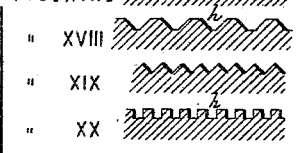
Attest:
W. E. Knight,
E. Arthur.
Inventor:
Gustav Adolph Buchholz
By Knight Bros
Atty (No Model.) 10 Sheets—Sheet 6.
G. A. BUCHHOLZ, Dec'd.
O. KNIGHT, Administrator.
GRAIN REDUCTION MACHINE.
No. 425,366. Patented Apr. 8, 1890.
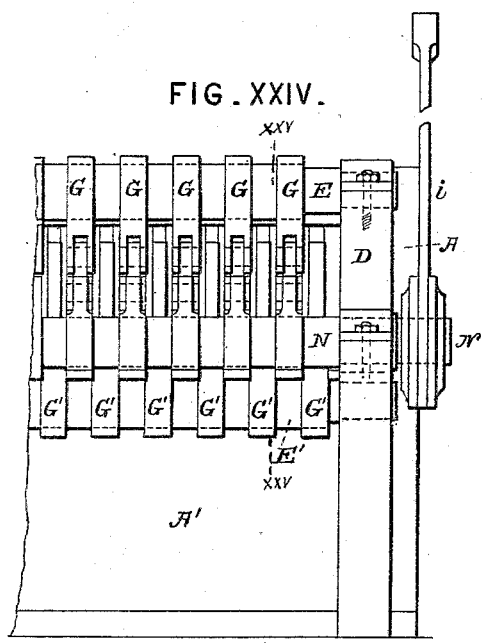
FIG. XXIV.
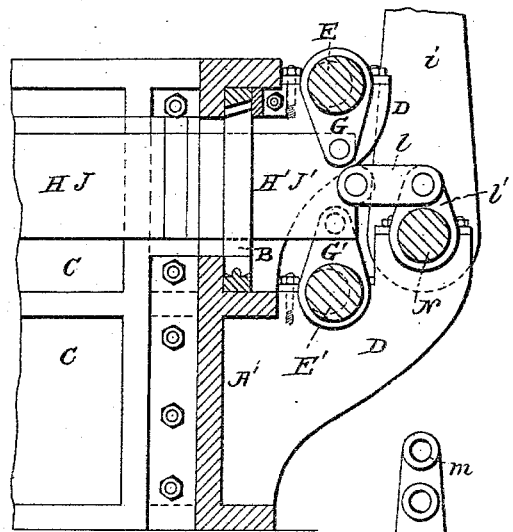
FIG. XXV.
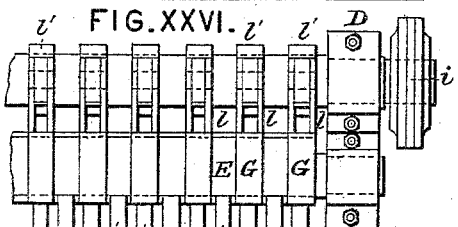
FIG. XXVI.
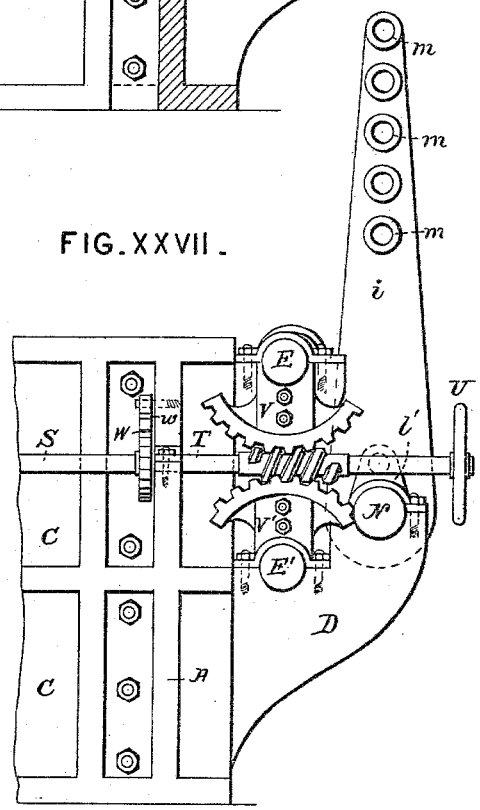
FIG. XXVII.
Attest:
W. E. Knight.
E. Arthur.
Inventor
Gustav Adolph Buchholz
By Knight Bros
Attys
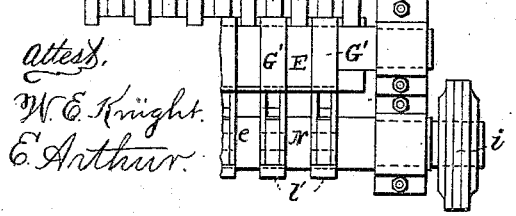
THE NORRIS PETERS CO., PHOTO-LITHO., WASHINGTON, D. C.

(No Model.) 10 Sheets—Sheet 7.
G. A. BUCHHOLZ, Dec'd.
O. KNIGHT, Administrator.
GRAIN REDUCTION MACHINE.
No. 425,366. Patented Apr. 8, 1890.
FIG. XXIX.
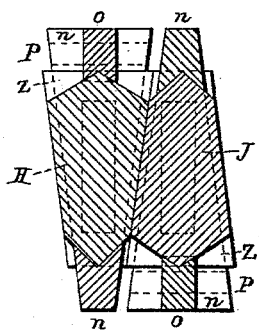
FIG. XXX.
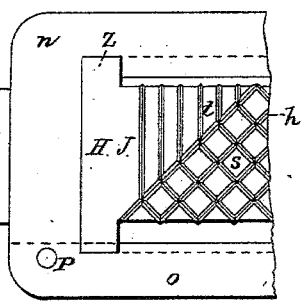
FIG. XXVIII.
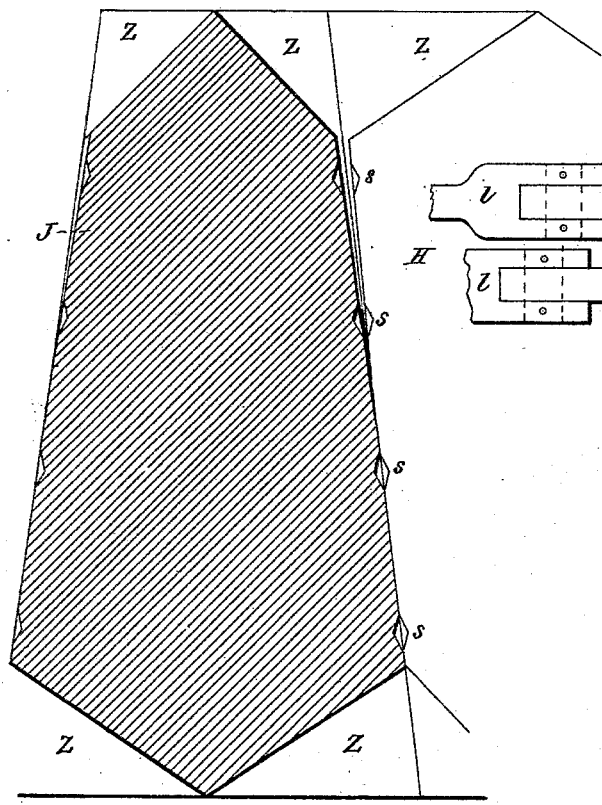
FIG. XXXI.
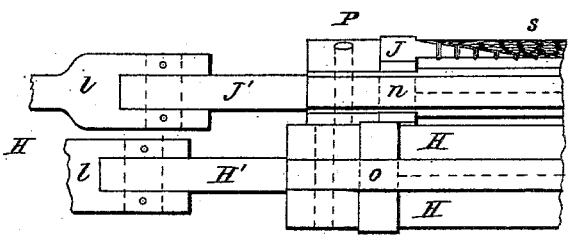
FIG. XXXII.
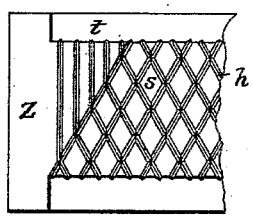
Attest:
W. E. Knight.
E. Arthur.
Inventor:
Gustav Adolph Buchholz
By Knight & Brig
attys (No Model.)  G. A. BUCHHOLZ, Dec'd.  10 Sheets—Sheet 8.
O. KNIGHT, Administrator.
GRAIN REDUCTION MACHINE.
No. 425,366.  Patented Apr. 8, 1890.
FIG. XXXIII.
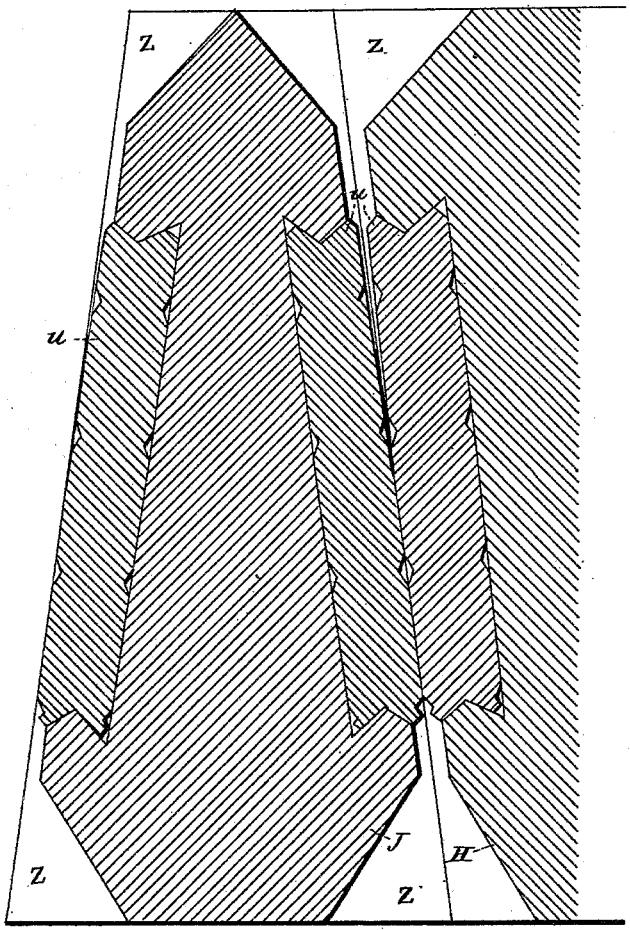
FIG. XXXIV.
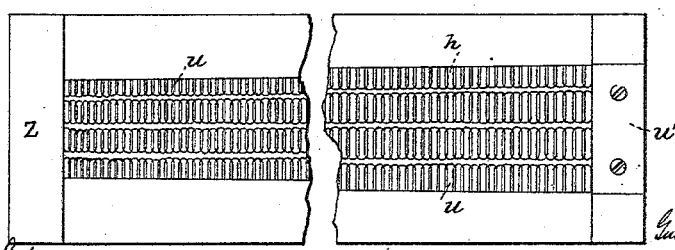

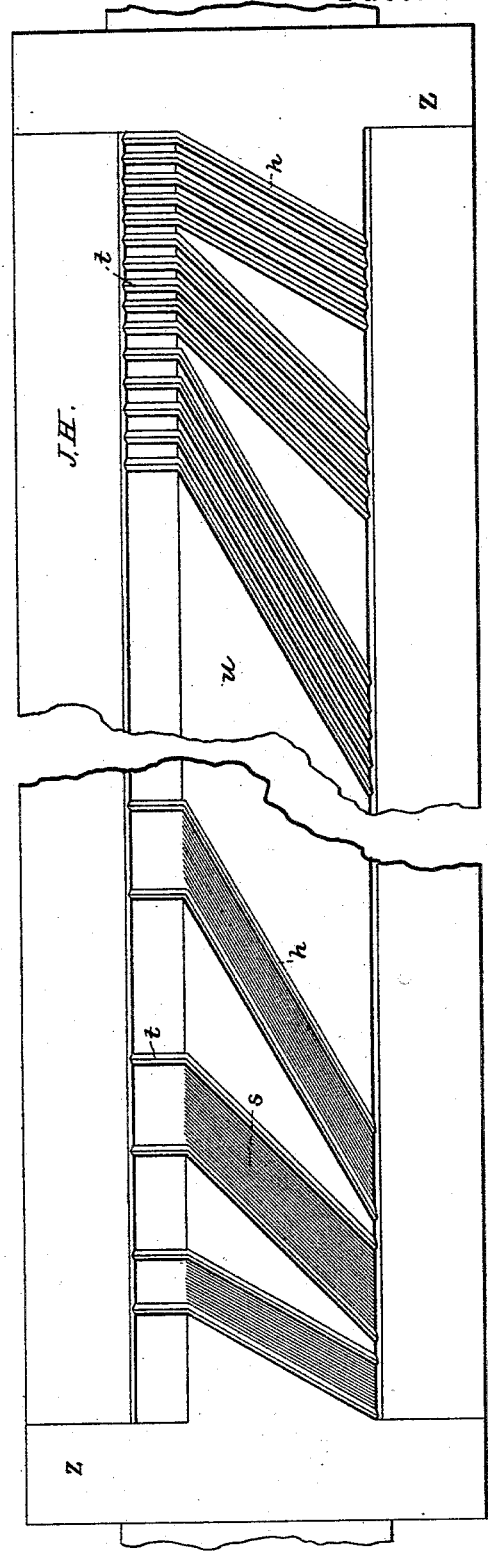

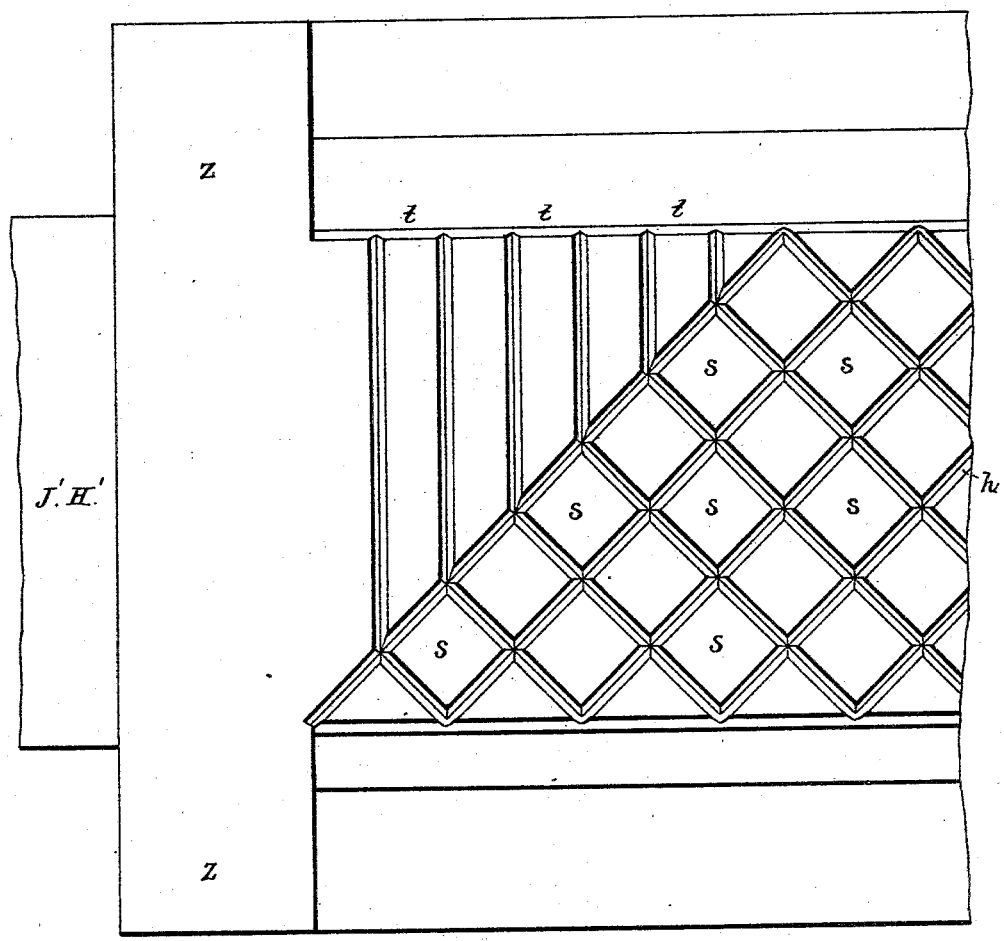
FIG. XXXVI.

UNITED STATES PATENT OFFICE.

GUSTAV A. BUCHHOLZ, OF FRANKFORT-ON-THE-MAIN, PRUSSIA, GERMANY; OCTAVIUS KNIGHT, OF WASHINGTON, DISTRICT OF COLUMBIA, ADMINISTRATOR OF SAID GUSTAV A. BUCHHOLZ, DECEASED, ASSIGNOR OF ONE-THIRD TO JAMES U. ROBERTSON, OF NEW YORK, N. Y.

GRAIN-REDUCTION MACHINE.

SPECIFICATION forming part of Letters Patent No. 425,366, dated April 8, 1890.

Application filed November 10, 1887. Serial No. 254,844. (No model.) Patented in England July 31, 1888, No. 11,032.

*To all whom it may concern:*

Be it known that I, GUSTAV ADOLPH BUCHHOLZ, engineer, a subject of the Emperor of Germany, residing at Frankfort-on-the-Main, Prussia, Germany, have invented certain new and useful Improvements in Grain-Reduction Machines, (English Patent No. 11,032, bearing date July 31, 1888,) of which the following is a specification.

My invention consists in certain improvements in the construction of mills for hulling and reducing grain, seeds, or other material.

I will first describe it with reference to the accompanying drawings, and then point out in the claims the novel parts and combinations.

In said drawings, Figure I is a vertical section of my improved mill on the line I I, Fig. IV. Fig. I$^a$ is a side elevation of one of the breaking members. Fig. II is a horizontal sectional view of the stationary portion of the machine on the line II II, Fig. III. Fig. III is a front view of the machine. Fig. IV is a plan view thereof. Fig. V is a vertical longitudinal sectional view on the line V V, Fig. IV. Fig. VI is a side elevation. In Figs. II, IV, V, and VI the central portion of the machine is broken away, and it is to be understood that the machine may be of any desired length. All of the foregoing views are made on a scale of one to ten, the breaking members being supposed to have a height of nine inches. Fig. VII is a detail transverse sectional view taken partly through the necks and partly through the bodies of the breaking members on the line VII VII, Fig. IV. Fig. VIII is a vertical sectional view taken through the necks of the breaking members, the plane of section being indicated by the line VIII VIII, Fig. X. Fig. IX is a face view of the straps or members connecting the breaking beams or members with their operating-shaft. Fig. X is a longitudinal sectional view through the operating mechanism of the breaking members. Fig. XI is a plan view of the same, a portion of the guides for said members being shown in section. Figs. VII to XI, inclusive, are made on a scale of one to four. Figs. XII to XX are horizontal sectional views of a portion of a breaking member, various styles of the groovings thereof being exhibited full size. Fig. XXI is a vertical transverse sectional view of two adjacent breaking members full size. Fig. XXII is a face view of a portion of one of said members. Fig. XXIII is a partial plan view of the machine on the scale of Fig. I, the feed-box being in horizontal section. Fig. XXIV is a partial front elevation showing a lever for operating the breaking members. Fig. XXV is a partial longitudinal sectional view of the same on the line XXV XXV, Fig. XXIV. Fig. XXVI is a partial plan thereof. Fig. XXVII is a partial side elevation thereof. Fig. XXVIII is a transverse vertical sectional view, full size, illustrating a form of breaking member made of porous porcelain or its equivalent. Fig. XXIX is a sectional view, on a smaller scale, illustrating the frames for supporting such members. Fig. XXX is a partial side elevation of such a member with a portion of its operating mechanism. Fig. XXXI is a partial plan of two of such members. Fig. XXXII is a view similar to Fig. XXX, showing the breaking face or portion detached from its frame. Fig. XXXIII is a vertical transverse sectional view, full size, through two adjacent breaking members, exhibiting a modification in the method of applying the working-surface. Fig. XXXIV is a face view, partly broken away, of one of such members on a smaller scale. Fig. XXXV is a partial side elevation of such a breaking member, showing several methods of forming the grooves. Fig. XXXVI is a partial side elevation of the same, showing another modification in the formation of the grooving.

According to the ordinary process of milling, whereby the grain is crushed or ground, much damage is caused to the semolino, and flour and the rapidity of reduction is impeded by the regrinding of particles which have already been sufficiently treated and by the failure of the apparatus to efficiently dislodge the bran and germ from the semolino. It is important that the process of reduction to flour should be postponed till the bran is entirely removed from the semolino, that there should be little comminution of the bran, and that the semolino should be obtained in as large particles as possible freed from bran. When so obtained, the pure semolino may be used as semolino for the market; or it may be reduced to flour, which flour, being produced from absolutely bran-free semolino can only be of the very highest type or quality. A further advantage of having to treat absolutely bran-free semolino for the production of flour is that this highest class of flour can be bolted through silk or the equivalent of large mesh and the whole quantity of semolino obtained from the wheat—that is, eighty-two to eighty-three per cent. is converted into flour of only one quality, and, I repeat, the highest quality.

For my new process of treating substances for reduction only a small fraction of the motive power is required as compared with the ordinary method. My invention has therefore for its object the production of a machine which shall in the manufacture of semolino crack or break the grain in such a manner as to efficiently dislodge the bran and germ from the semolino, or which shall in the manufacture of flour reduce the semolino to the required degree, promptly discharging all particles which have been sufficiently treated, being free of particles of bran.

In carrying out my invention I employ a series of two or more bars or beams arranged adjacent to one another on edge and oppositely tapered, their adjacent faces being appropriately grooved, according to whether they are to be used for the production or cleaning of semolino or for reduction of the same to flour. The series are divided into two sets—an upper and a lower set. H J may represent such bars, the former being shown as tapered downward and the latter as tapered upward. These bars are of any desired length, width, thickness, and number. They are carried by a frame having side plates A and end plates A' bolted together. In the side plates A are formed openings C, having suitable doors, permitting access to the interior of the machine. Brackets D D' are cast or fixed on the end plates, or at the ends of the side plates, to support bearings for the several shafts, hereinafter referred to.

For the purpose of cracking or breaking grain, seeds, or other material, as in the production of semolino, the working-faces of members H J are provided with vertical or substantially vertical grooves $h$, which may, as shown in Figs. XXI and XXII, be divided into a number of horizontal courses by horizontal channels $x$, each lower course having grooving of less width than that of the course immediately above. Reciprocation is imparted to one or both of the sets of bars or members H J, each alternate bar moving in a relatively opposite direction to the adjacent member. The reciprocation is equal to the pitch of the largest grooving of the breaking members, so that each ridge between the grooving is carried from a position over one ridge on the adjacent member to a similar position over the next ridge, thereby thrusting the material which has fallen into the channels between the members against the sharp edges of the approaching ridges, breaking and cutting it. The return-stroke of the breaking members then carries the groovings back to their original position opposite to each other, forming a series of tubes, through which the material which has been sufficiently cracked falls, and into which a new charge of material to be treated drops from the feed-box.

In the form shown in Fig. XXII the material falls freely into the vertical channels formed by the large grooves of the top course and is cracked with the dislodgment of a certain portion of the bran. To act upon the now somewhat smaller particles, the next lower course is made with smaller grooves, and the horizontal channel $x$, (which may be of various shapes, as shown in Fig. XXI,) distributes the material thereto, and so on till the material is discharged from this machine, each following lower course of finer grooving acting on somewhat smaller particles and continuing the process of separating the bran from the rest of the berry. The material which has been comminuted by any of the grooves falls readily through to the bottom without being reground or broken. At the top of each course the grooves are flared slightly, as shown at $y$ $y$, so as to facilitate the feeding of the grain between the breaking members. Instead, however, of having the treatment advanced so far in a single machine, a number of machines may be provided, each furnished with breaking members having grooves of same size throughout. The grooving is, however, in this case made of different width in the several machines, decreasing as the material to be treated diminishes in size; or in case it may be desired the horizontal channels $x$ may be omitted from the form shown in Fig. XXII, and the grooving may slightly taper in depth from top to bottom, so that a large charge may be received at the top of the members, owing to the large size of the grooving, and yet the diminished depth of the grooving at the base of the members will render it possible to obtain considerable reduction of the material in a single machine.

Figs. XII to XX illustrate various forms which the grooves may assume in transverse section. Those shown in Figs. XII and XIV are preferable, and that illustrated by Fig. XIV is especially valuable. In this form the groove has in transverse section the form of the half of a flattened ellipse. The shallow channel thus afforded is adapted to support the grain near the surface of the breaking member and bring it into contact with the passing ridges of the adjacent member, while at the same time the edges of the grooves are so sharp as to be efficient in cutting and breaking the grain. Such a form may also receive a large charge of material to be treated, and affords a channel not only for such material, but free space at the sides wherethrough material which has been sufficiently treated may be discharged.

In certain cases—as, for example, when the machine is to be used for the freeing of semolino which has has been made on other machines from bran which is still attached to it, or for the reduction of semolino to flour, or if other material than breadstuff is to be treated—the direction of grooving is changed somewhat, according to the style of work to be performed.

Fig. XXXV shows a breaking or reducing bar having various styles of grooving formed on it. The grooves shown are made V-shaped in cross-section; but the cross-section may be of any other shape preferred. At the right are shown grooves inclined at various angles. In practice one or the other angle would be selected, according to the amount of working the material requires. It will be readily seen that the more nearly vertical the grooves the more rapid will be the motion of the material between the bars and its discharge therefrom. At the left-hand end of the bar are shown groovings spaced some distance apart, allowing between them elevated flat portions $s$. Such a form is very efficacious in reducing semolino to flour. The flat portion between the grooves may be and preferably is scored or roughened, as shown. In Figs. XXX, XXXII, and XXXVI, I have shown this principle carried still farther, the inclinations of the grooves being opposite, so as to cross each other, providing raised flat portions $s$, whereon the semolino is forced by the grooves and ground to flour. These grinding-surfaces may be square, as shown in Fig. XXX, or rhomboidal, as shown in Fig. XXXII. In these forms, in order to insure the entrance of the grain or parts thereof between the bars, the upper portions of the grooves are, as shown at $t$ in Fig. XXXV, made vertical, or nearly so. In any case, it is not necessary that the grooving on two adjacent faces should be identical in angle. A grooving of greater or less inclination on one member may be worked with a grooving in a vertical plane, or one having any desired angle on the other member, the form being selected with reference strictly to the work to be accomplished. The bars are set at such distance asunder as to permit material sufficiently treated to fall through.

At the ends the breaking members H J are made with shoulders Z Z, which prevent the outward flow of the material. These parts of the breaking bars or beams are not grooved or channeled.

I have shown in the drawings various conformations of the working-surface of the members H J. In Figs. V and XXI the said members are made of a single block of steel, chilled iron, stone, or earthenware. In Figs. XXVIII to XXXII, I have illustrated a form in which the grooving is formed in a block of porcelain, steel, or other suitable material H J, which is mounted in a metallic frame $n$ $o$, the portion $o$ turning on portion $n$ of the frame by means of a pivot-bolt $p$ to allow the working-surface H J to be applied or removed at pleasure. A similar bolt serves to support the free end of the bar $o$ of the frame when it has been turned up into position to hold the working-surface in. In Figs. XXXIII and XXXIV, also, I have shown the surface $u$ (having the grooving) detachable. Here it is made slightly wedge-shaped longitudinally, as shown in Fig. XXXIII, and when slipped into its seat in the block or bar J or H it is held therein by a cleat $u'$, having suitable countersunk screws or bolts. In this view the taper of the piece $u$ is necessarily largely exaggerated for the purpose of illustration. In Fig. XXXV this separate working-face of porcelain or other material is also represented; but this view is intended solely to exhibit certain kinds of groovings already described, and it is to be understood that the groovings therein shown may be made on any kind of bar.

The necks H' J' of bars or members H J are mounted in the machine between vertical guides K, which have tenons L at top and bottom seated in mortises in bars M, carried by the frame. At the bottom a bead or rod L' occupies notches in the bottom of said guides and retains them against movement longitudinally of the machine. At the top the guides K are beveled inward, so as to seat against a similar bevel on the bars M, and they are held in their seats by cleats M' and suitable bolts M'', so that they may be removed at pleasure. By this means the members H J can be taken out at will for the renewal or the sharpening of their grooves, or for replacing them by similar members having different widths of grooving. It is important that the grooving should correspond with the work to be done, being in each case slightly less in width or depth, or both, than the diameter of the particle to be treated. Thus for wheat or its parts, for seeds of various kinds, and for cracking nuts or their parts groovings of different widths would necessarily be employed.

Various mechanisms for actuating the breaking-bars or members H J may be employed. My preferred arrangement for the purpose is that represented, in which a powerful leverage is employed to produce the requisite slight motion of the working-faces. Accordingly in Figs. XXIV to XXVII, I have shown the counter-shaft N, (which is connected to the breaking-bars H J by links or connecting-rods $l$ and cranks $l'$,) provided with an operating-lever $i$. This lever may, as shown in Fig. XXVI, be duplicated at each end of the machine, each lever operating one set of breaking bars or members in opposite direction to the other set, and, as shown in Fig. XXVII, a number of holes $m$ may be provided to lengthen or shorten the stroke of the breaking members, the power being connected to one or the other, according to the amplitude of stroke required. It will in some cases be desirable to change the bars, replacing them by others having freshly-made or sharpened groovings, or having groovings of different width. For example, for breaking cotton-seeds or other large seeds from which oil is to be expressed, or for cracking nuts, a larger grooving would be necessary than would be employed in the reduction of wheat, and the stroke of the lever should be so adjusted that the shell of the seeds or nuts being treated will be simply cracked, the material being then immediately released and allowed to drop through the channels provided by the grooves.

In Figs V and X, I have illustrated the use of eccentrics for operating the breaking-bars H J. Such eccentrics O O' are carried by the counter-shaft N. Straps or boxes P P', secured upon these eccentrics by keys Q Q', are connected by pivot-bolts to the breaking-bars H J. The eccentrics are preferably so adjusted as to synchronously reciprocate the alternate breaking members in opposite directions, the counter-shaft N and its straps and eccentrics forming connections between all the bars of each set.

In order that the bars H J shall be supported so as to move with as little friction as possible, they are carried by links G G', connected thereto by pivot bolts or studs $q$. Possibly, also, the slight vertical rocking which the members have by reason of this method of supporting them facilitates the feed and discharge of the material being treated.

For the purpose of enabling adjustment of the spaces between the working-faces of the breaking members, such members are made wedge-shaped, as shown in vertical section in Figs. XXI, XXVIII, and XXXIII. For adjusting, all of the upper members may be raised or lowered, or all of the lower members may be so shifted; but preferably, in order that the center of the grinding-surface shall remain on the same horizontal plane, I adjust both upper and lower members by means shown in detail in Figs. V and X. Here the links G G' are carried by eccentrics F F' on shafts E E'. These shafts carry segment-racks V V', operated simultaneously from either end of the machine by a longitudinal shaft S, having hand-wheels U. Ratchet-wheels W, having gravity-pawls $w$, form locks to prevent the retrograde movement of the shaft S, and so hold the links G G' and the breaking members to any desired position of adjustment.

Figs. I and XXIII exhibit the feed-box $d$. The bottom $d'$ of this is made, preferably, of corrugated iron bolted in the frame and supported on flanges $d''$. It is provided with a number of troughs, whereby the stock or material to be treated is fed between the breaking members. By means of the bar $e'$, Fig. XXIII, all of the feed-slides $e$ may be so adjusted as to leave any desired width of feed-aperture, according to the amount of material which the machine is capable of treating. The pipes $f$ may, as the name implies, be of small diameter; or they may be chutes flattened laterally and extending from end to end of the machine.

The material to be treated enters the feed-box by one or any number of spouts, and is by the feed-slides fed between the grinding-bars H J with any desired degree of rapidity. Between such bars it is treated in the manner described, each particle being cracked or broken between the approaching sharp edges of the grooves in such bars, and then released as the members on the return-stroke bring the grooves face to face and form large channels for the discharge of the material. After passing between said breaking members the discharged material is carried by a spout $h$ to any suitable separator, whereby the material is graded, and all particles which still have bran adhering thereto or (if the machine is being used for manufacturing flour) which are not sufficiently reduced are returned to the proper machine for re-breaking. By practical experiment I have found that by this machine there is produced from eighty-two to eighty-three per cent. of absolutely pure semolino, which is of one grade or quality instead of being divided into various grades of different degrees of purity, as heretofore, so that on reduction to flour there is produced an equal percentage of the highest class or "patent" flour.

Having thus described my invention, the following is what I claim as new therein and desire to secure by Letters Patent:

1. The combination, with a frame having suitable guides and a feeding-spout, of a series of vertically-fluted breaking or cracking members of prismatic wedge shape, arranged in a horizontal series, the consecutive members being correspondingly tapered alternately upward and downward, and means for causing the alternate members to reciprocate relatively to the remaining members, substantially as set forth.

2. The combination of a suitable frame, a series of parallel reciprocating reversely-tapered bars or beams forming breaking or cracking members, a series of parallel vertical guides for said members, having spaces between them wherein said members may be raised or lowered, a connection between all the alternate breaking or cracking members, and means, substantially as described, for adjusting such alternate members simultaneously, for the purpose set forth.

3. The combination of a suitable frame, a series of reciprocating bars or beams H J, wedge-shaped in vertical section and whose adjacent faces have a series of vertically-downwardly-lessening flutings, a connection between the bars or beams J, a connection between the alternate bars or beams H, and a common shaft for operating both connections, raising one set of members and depressing the other set, substantially as set forth.

4. The combination of a suitable frame, a series of parallel bars or breaking members guided thereon, two counter-shafts connected, respectively, with the alternate members, and a lever on each shaft for operating the same and reciprocating said members synchronously in opposite directions.

5. The combination of a suitable frame, a series of parallel reciprocating bars or breaking members, a pair of transverse shafts mounted on the frame at each end of the bars or breaking members, and links on the respective shafts connected to the alternate bars or breaking members, substantially as set forth.

6. The combination of a suitable frame, a series of parallel reciprocating bars or breaking members, transverse shafts, eccentrics thereon, and links supporting said bars or breaking members and operated by said eccentrics, substantially as set forth.

7. The combination of the series of parallel reciprocating bars or breaking members wedge-shaped in transverse section, transverse shafts supporting the alternate bars or breaking members, eccentrics thereon for adjusting said bars or breaking members vertically, and segment-racks, also located on said transverse shaft, and an operating-shaft having worms gearing with said segment-racks, substantially as set forth.

8. The combination of parallel reciprocating bars or breaking members H J, paired shafts E E', having eccentrics and links connected with the alternate members H J, segment-racks V V', and shafts S, having worms T, engaged with said segment-racks, substantially as and for the purpose set forth.

9. The combination of the parallel reciprocating wedge-shaped bars or breaking members H J, paired transverse shafts E E', having eccentrics and links connected with said bars or breaking members H J, segment-racks V V' on said shafts, shaft S, having worms T gearing with said segment-racks, and a lock for preventing retrograde motion of said shaft S, substantially as set forth.

10. In a grinding-mill, the combination of two corrugated horizontally-reciprocating vertical grinding-plates, with their corrugated surfaces bearing directly against each other, and suitable supporting and reciprocating mechanism of ordinary character.

G. A. BUCHHOLZ.

Witnesses:
JAMES U. ROBERTSON,
HARRY E. KNIGHT.